(12) United States Patent
Zabawskyj et al.

(10) Patent No.: US 7,680,491 B2
(45) Date of Patent: Mar. 16, 2010

(54) METHOD AND SYSTEM ALLOWING FOR ONE MOBILE PHONE NUMBER (MSISDN) TO BE ASSOCIATED WITH A PLURALITY OF WIRELESS DEVICES ('MULTI-SIM')

(75) Inventors: Bohdan Konstantyn Zabawskyj, Woodbridge (CA); Steven Robert Tait, Toronto (CA); Rubens Rahim, Toronto (CA); Claire Marion Burton, Munich (DE)

(73) Assignee: Redknee Inc. (CA)

( * ) Notice: Subject to any disclaimer, the term of this patent is extended or adjusted under 35 U.S.C. 154(b) by 874 days.

(21) Appl. No.: 10/438,097

(22) Filed: May 15, 2003

(65) Prior Publication Data

US 2004/0229601 A1    Nov. 18, 2004

(51) Int. Cl.
*H04M 3/42* (2006.01)
(52) U.S. Cl. .............. 455/417; 455/415; 455/432.2; 455/445
(58) Field of Classification Search ........ 455/517, 455/461, 417, 413, 432.2
See application file for complete search history.

(56) References Cited

U.S. PATENT DOCUMENTS

| 6,141,564 | A | 10/2000 | Bruner et al. |
| 6,466,804 | B1 | 10/2002 | Pecen et al. |
| 6,937,713 | B1 * | 8/2005 | Kung et al. ............. 379/211.02 |
| 2002/0094811 | A1 * | 7/2002 | Bright et al. ................. 455/433 |
| 2002/0154632 | A1 | 10/2002 | Wang et al. |
| 2003/0125072 | A1 * | 7/2003 | Dent ........................... 455/551 |
| 2004/0110465 | A1 * | 6/2004 | Bedingfield et al. ......... 455/3.05 |
| 2004/0180676 | A1 * | 9/2004 | Haumont et al. ............. 455/461 |
| 2004/0185888 | A1 * | 9/2004 | Serge .......................... 455/517 |

FOREIGN PATENT DOCUMENTS

| EP | 1 098 543 A1 | 5/2001 |
| GB | 1098543 | 1/1968 |
| GB | 2 375 261 A | 11/2002 |

OTHER PUBLICATIONS

Suthaharan Sivagnanasundaram, GSM Mobility Management Using an Intelligent Network Platform, Dec. 1997, University of London, pp. 27-30 and 61-90.*
GSM 03.40, Digital cellular telecommunications system (Phase 2+); Technical realization of the Short Message Service, Oct. 1996, Fourth Edition, France (first page only).
GSM 09.02, Mobile Application Part (MAP) specification, Dec. 2000, Ninth Edition, France (first page only).
GSM 03.90, Digital cellular telecommunications system (Phase 2+); Unstructured Supplementary Service Data (USSD)-Stage 2, Dec. 1996, Version 5.0.0, France (35 pp.).

* cited by examiner

*Primary Examiner*—Patrick N Edouard
*Assistant Examiner*—Eric Elcenko
(74) *Attorney, Agent, or Firm*—Katten Muchin Rosenman LLP

(57) ABSTRACT

The method and system allowing for one mobile phone number (MSISDN) to be associated with a plurality of wireless devices is described.

42 Claims, 8 Drawing Sheets

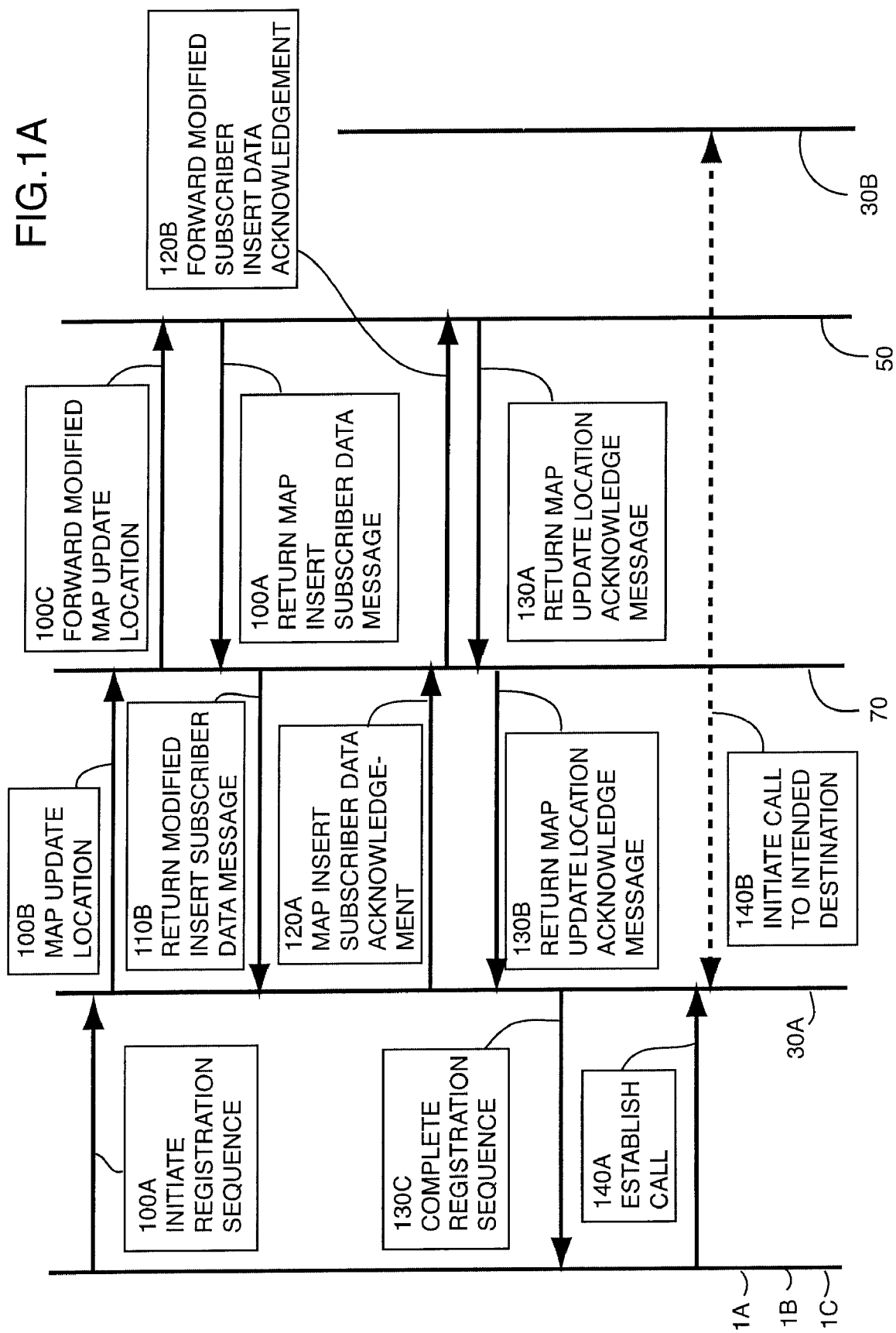

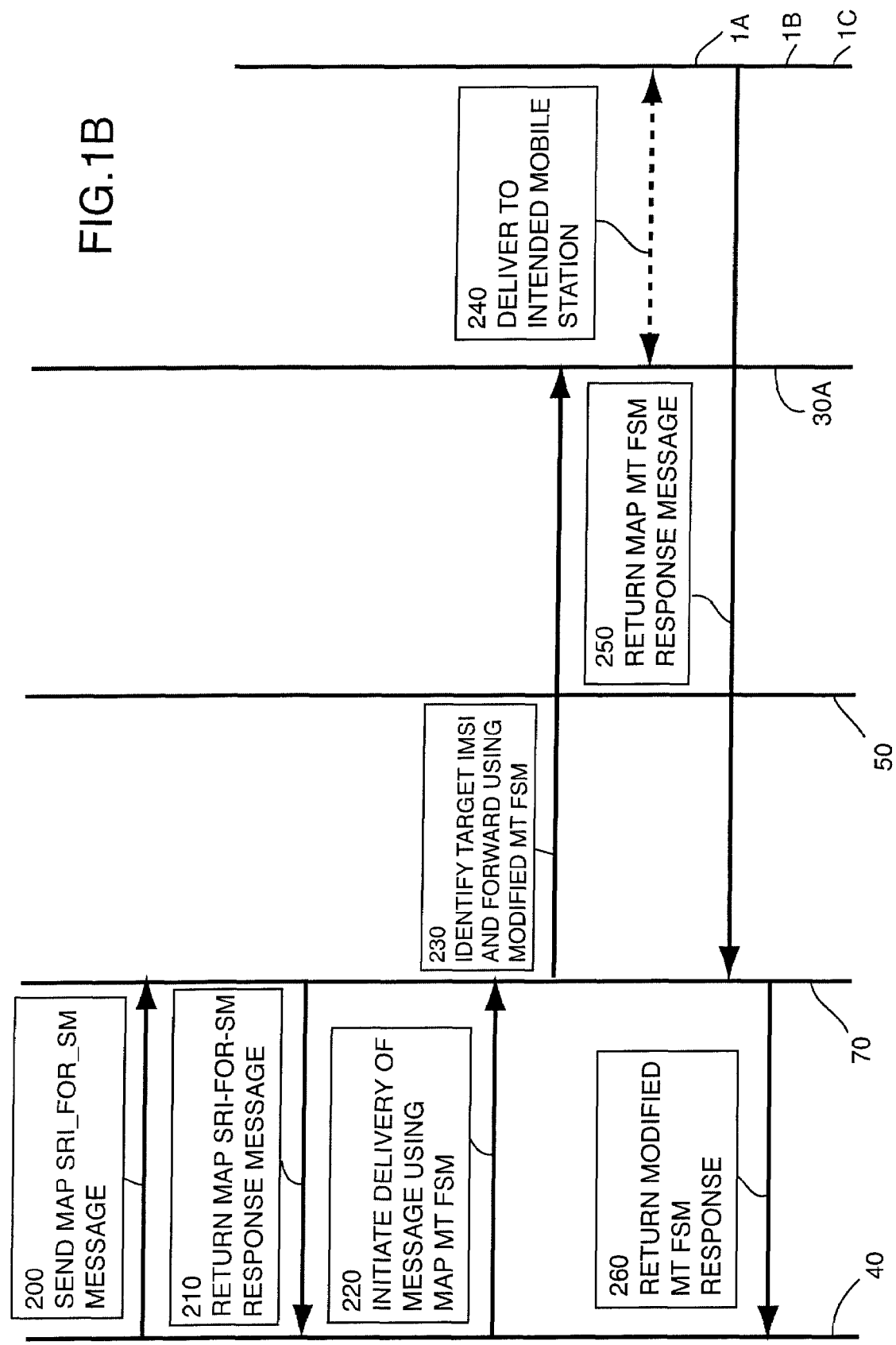

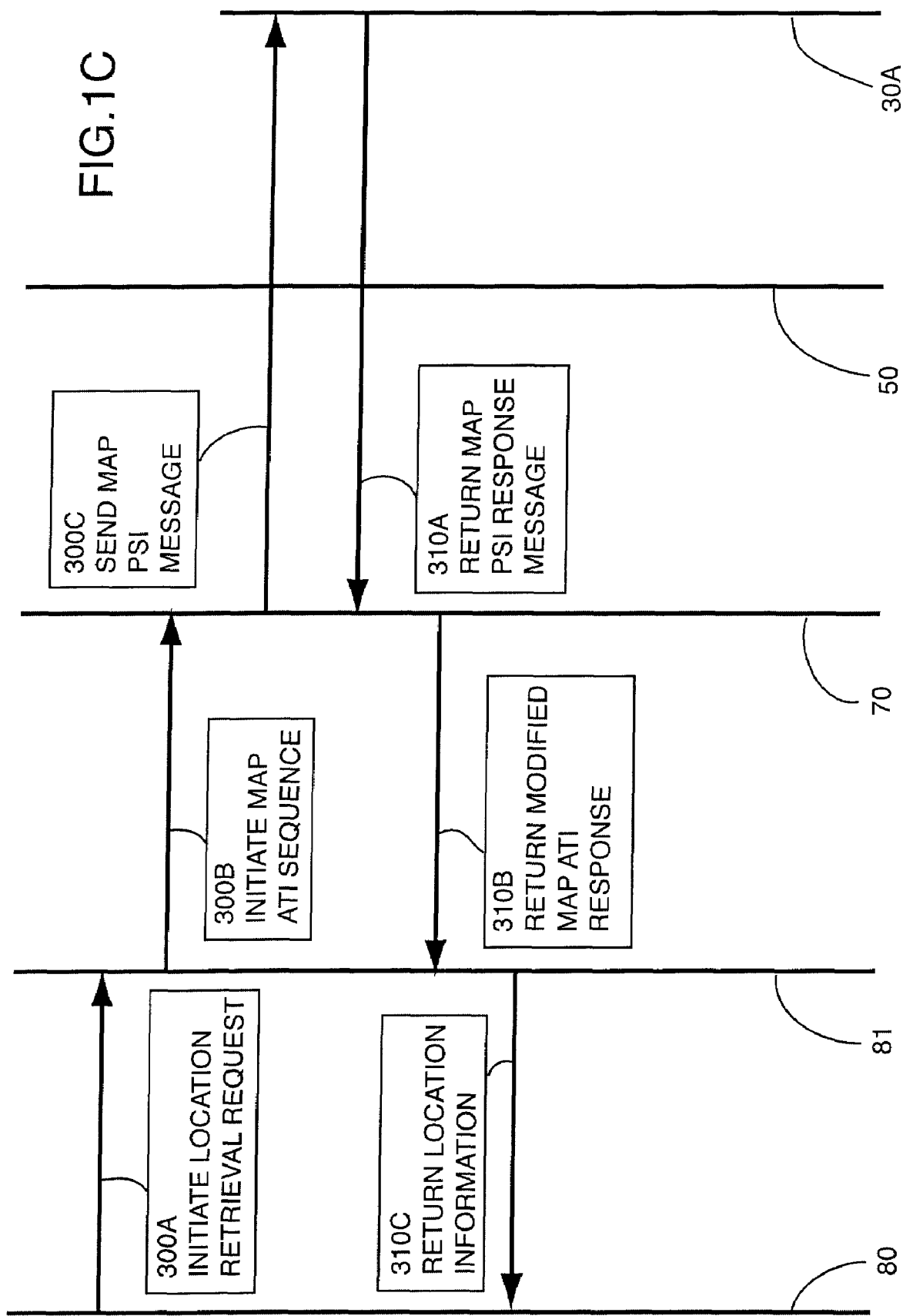

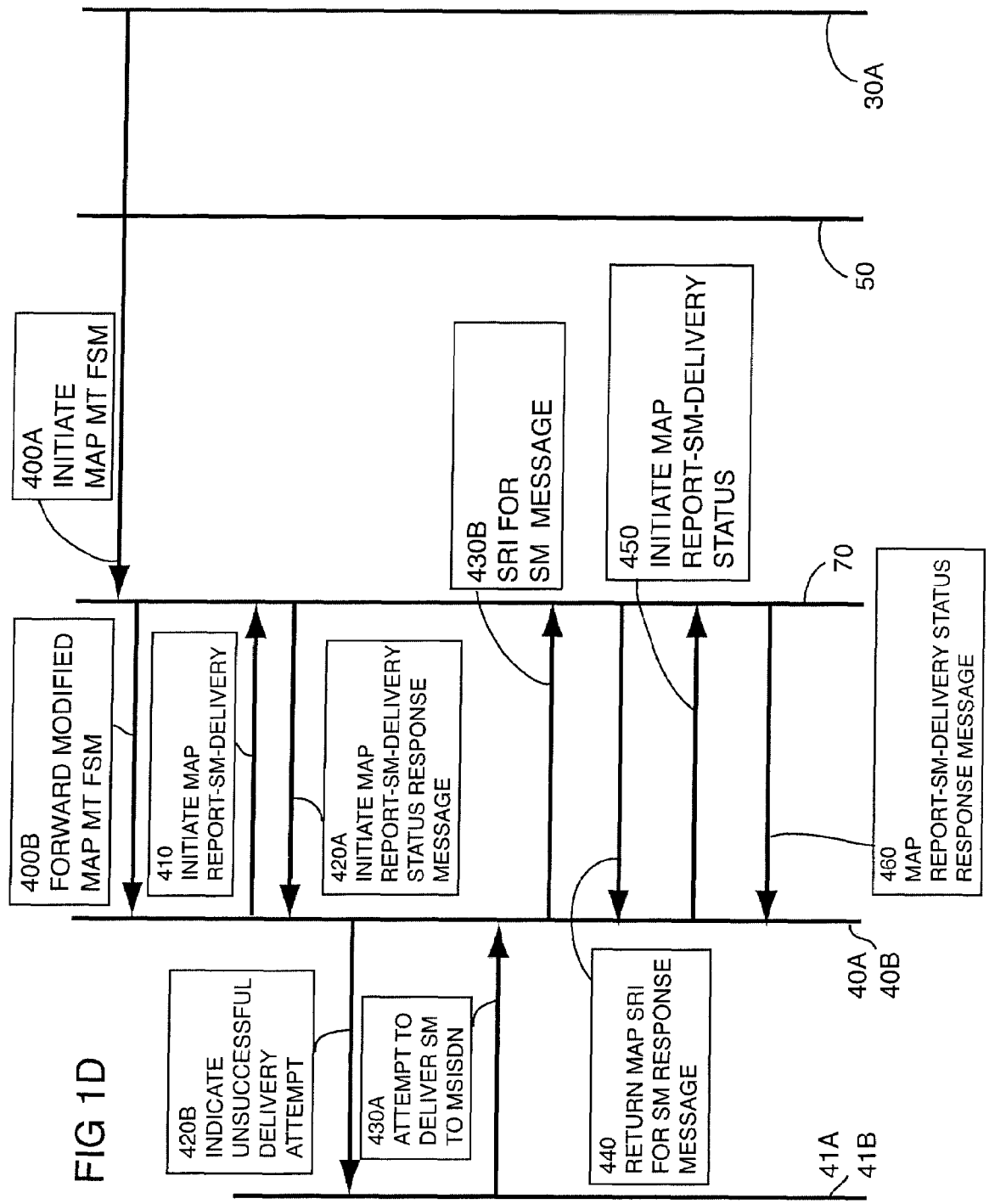

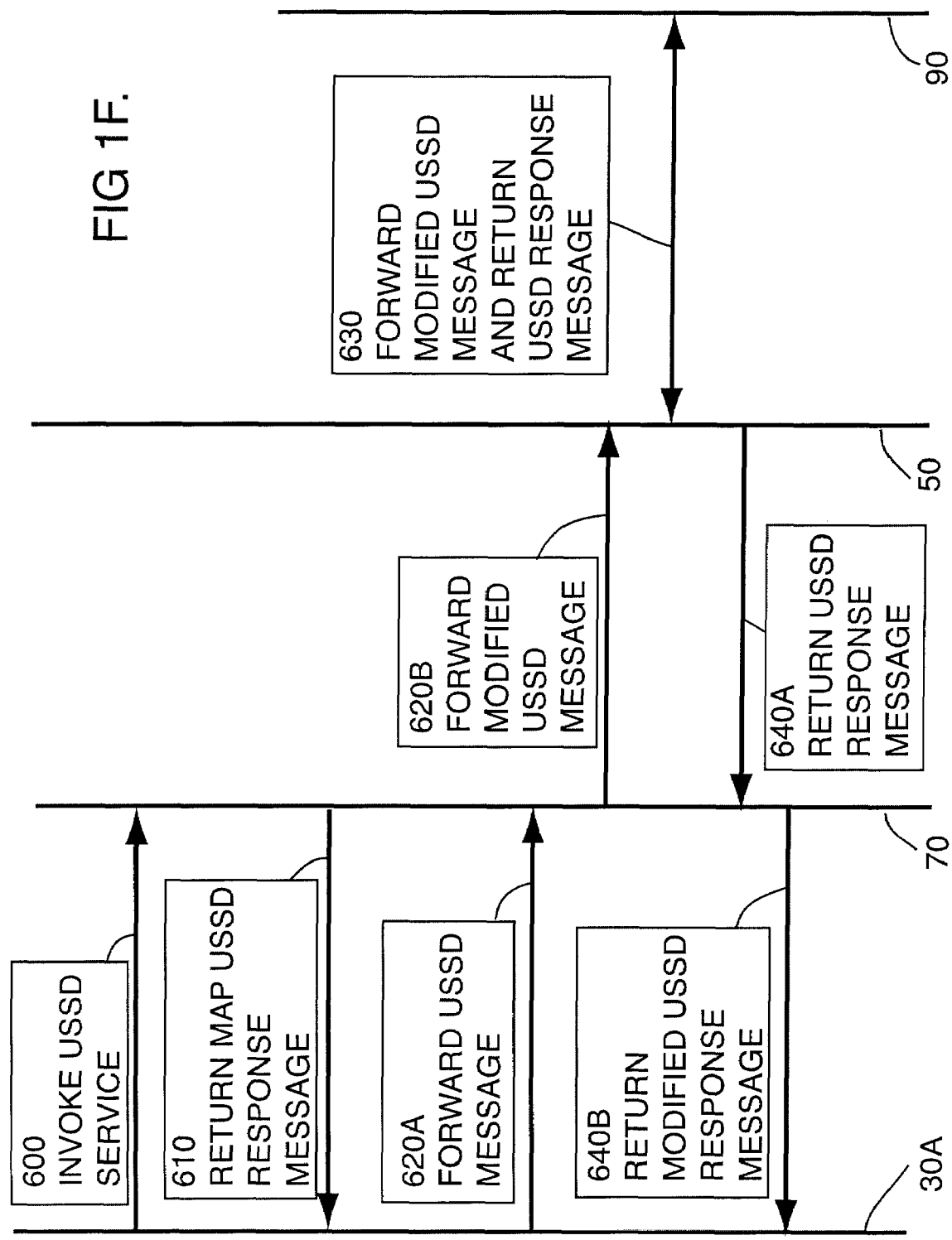

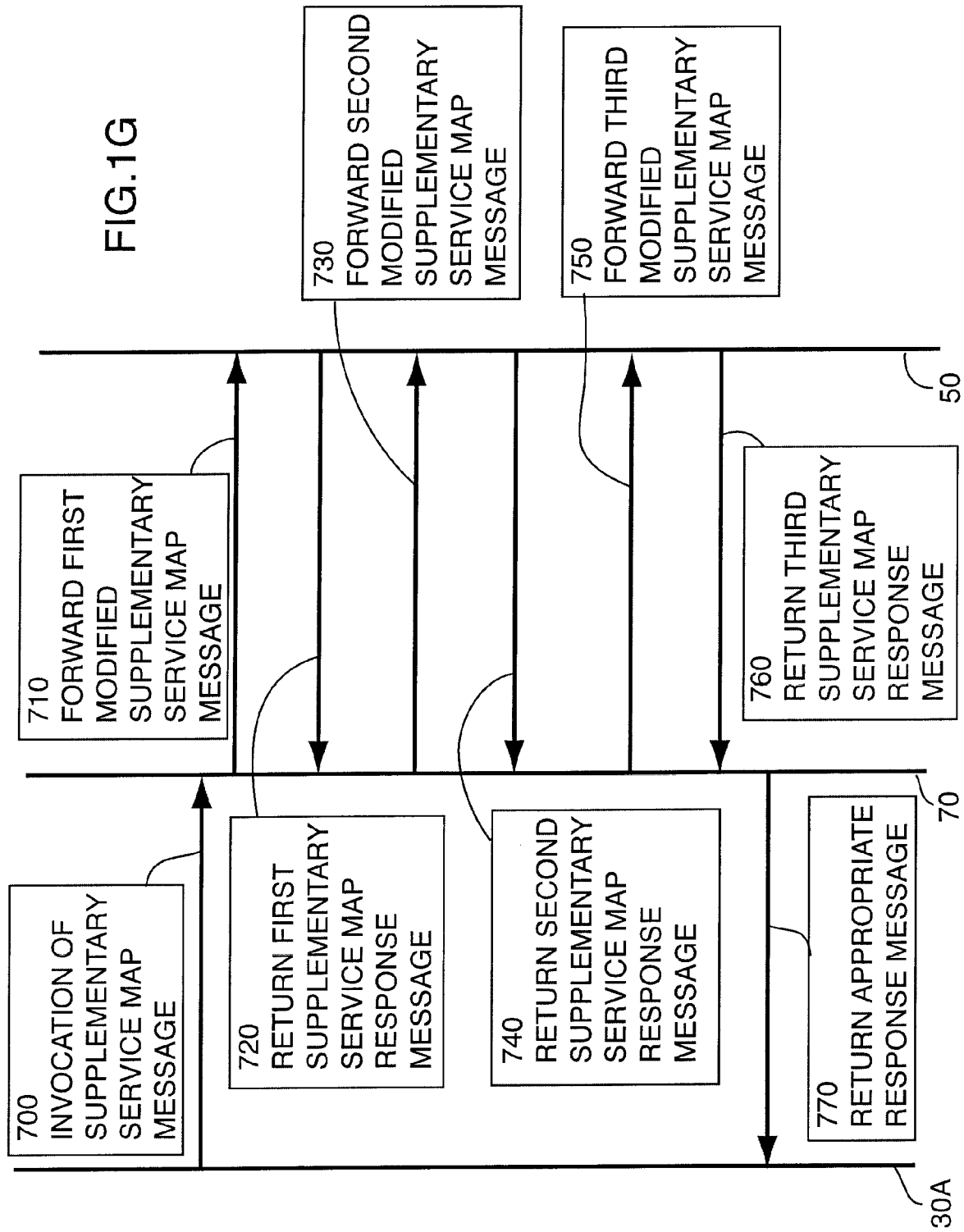

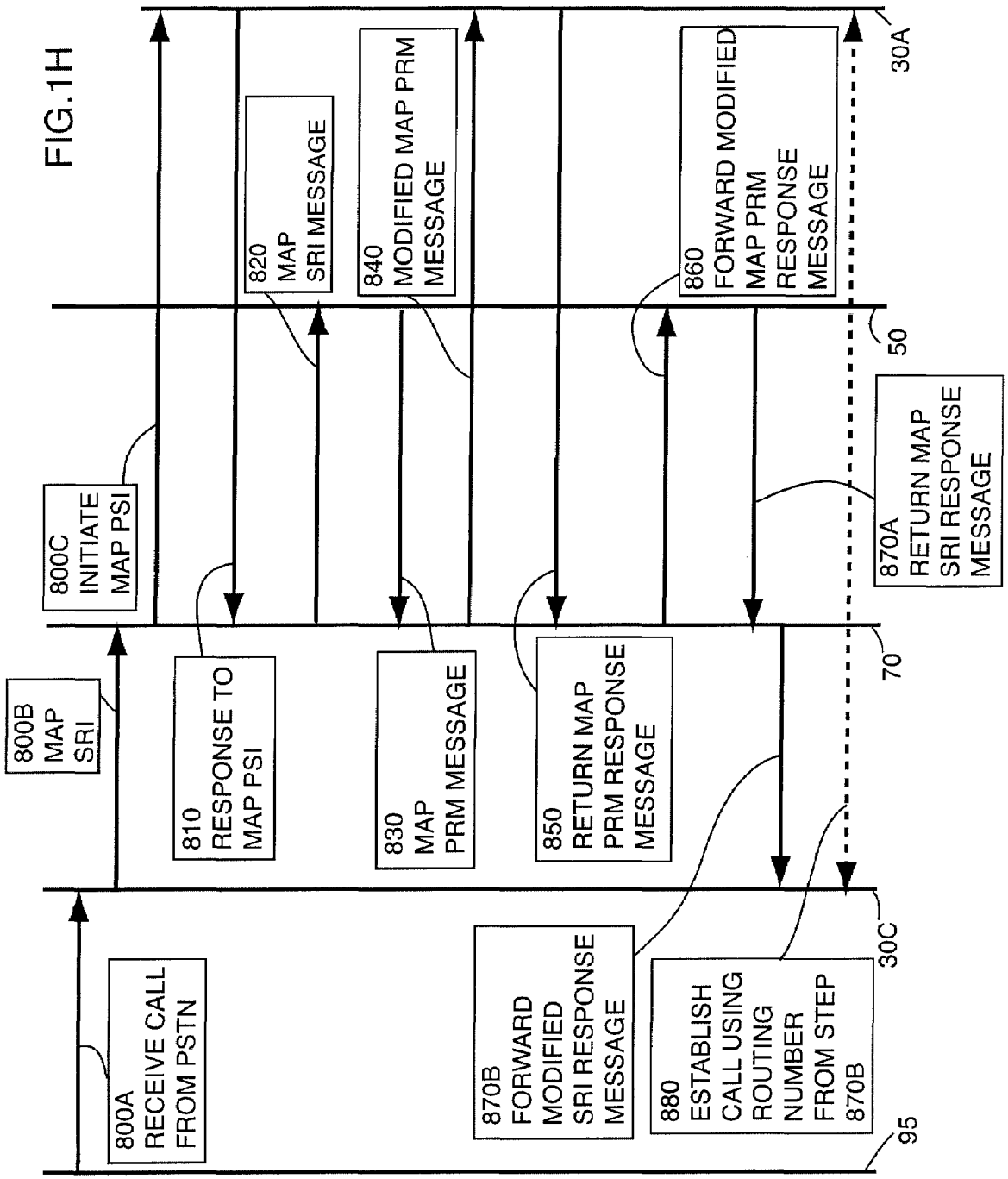

METHOD AND SYSTEM ALLOWING FOR ONE MOBILE PHONE NUMBER (MSISDN) TO BE ASSOCIATED WITH A PLURALITY OF WIRELESS DEVICES ('MULTI-SIM')

FIELD OF INVENTION

The present invention relates to a method and system allowing for one mobile phone number (MSISDN) to be associated with a plurality of wireless devices.

BACKGROUND ART

As a whole, the teachings of the prior art demonstrate that it has largely been pre-occupied with other priorities within this niche. For instance, much art is devoted to varied apparatus for allowing one wireless phone to share two (or more) telephone numbers (or SIMs) or conversely for allowing one SIM card to be shared between two masters (as between a cellular radiotelephone and multi-mode satellite radiotelephone as detailed for instance in U.S. Pat. No. 6,141,564 to Bruner, et al. entitled: "Method of Sharing a SIM Card Between Two Masters").

And similarly, other art has likewise been devoted to switching between multiple SIM cards within a wireless phone as to maximize time-of-day discounts (consider for instance European Patent Application 1098543 by Fragola, F.), or as to lower roaming costs (consider U.S. patent application publication no. 2002/0154632 by Wang, Yung-Feng et al.) and so forth.

Other inventions, as UK Patent No. 2375261 to Hiltunen, M. entitled: "Transfer of SIM Data Between Mobile Computing Devices", are devoted to 'acquiring' the identification information contained within the SIM card of one mobile phone and transferring it to another, thereby creating a manner of 'virtual' SIM, thereby obviating for physically transferring SIM cards between wireless devices and the corresponding lag and down-time associated with such.

Still further art as U.S. Pat. No. 6,466,804 to Pecen, et al. entitled: "Method and Apparatus for Remote Multiple Access to Subscriber Identity Module", details a method and apparatus for remote multiple access to services of a subscriber identity module (SIM) card by multiple subscriber devices in a GSM (Global System for Mobile communications) system. The crux of the subject matter delineated thereof deals with the scenario whereby multiple wireless devices use a single SIM. Whereas the invention of present seeking the protection of Letters Patent effectively enables multiple independent SIMs (e.g. with individual IMSIs) to appear as a single SIM for the purpose of providing telephony services via a macroscopic (GSM) carrier.

Some relevant GSM standards are: (1) GSM 03.40, Digital cellular telecommunications system (Phase 2+)—Technical realization of the Short Message Service (SMS); (2) GSM 09.02, Mobile Application Part (MAP) Specification; and (3) GSM 03.90, Digital Cellular Telecommunications System (Phase 2+)—Unstructured Supplementary Service Data (USSD)—Stage 2.

SUMMARY OF THE INVENTION

A method and system allowing for one mobile phone number (MSISDN) to be associated with a plurality of wireless devices (Multi-Subscriber Identity Module or "Multi-SIM") is described herein. The method and system allows a wireless subscriber to present/utilize one phone number (Mobile Station Integrated Services Digital Network (MSISDN) Number) across a plurality of wireless devices (and their inherent, requisite SIMs (Subscriber Identity Modules)). Effectively, the invention of present seeking the protection of Letters Patent enables multiple independent SIMs (e.g. with individual IMSIs (International Mobile Station Identifiers)) to utilize the same phone number (MSISDN) for the purpose of providing telephony services via a macroscopic (GSM) carrier. The collective effect of the invention with respect to the telecommunication services which can be offered via a plurality of wireless devices will be characterized as the 'Multi-SIM' service.

Embodiments of the present invention allow a common phone number (MSISDN) to be always displayed when originating a telecommunication, even across a multiplicity of wireless devices.

In one embodiment, the mobile subscriber in question may choose which wireless device (and its associated SIM) he or she wishes to receive telecommunications upon in the preferred embodiment. In particular, various non-limiting manifestations of the invention may optionally direct Voice, SMS (Short Message Services), MMS (Multi-Media Message Services) and/or MWI (Message Waiting Indicator) services towards different wireless devices and their associated SIMs. Optional manifestations of the invention limits the number of simultaneous telecommunications activity which emanate from the plurality of devices associated with the Multi-SIM service. Further optional manifestations of the invention permits the automated redirection of telecommunications services (e.g. call delivery and location retrieval) based on a pre-configured settings or the detection of activity from the plurality of wireless device or active polling to determine the status of the plurality of wireless devices.

BRIEF DESCRIPTION OF THE DRAWINGS

FIG. 1A details a non-limiting call-flow of the subscriber registration sequence for mobile originated voice telecommunications of the method and system allowing for one mobile phone number (MSISDN) to be associated with a plurality of wireless devices;

FIG. 1B represents a non-limiting call-flow detailing the means through which mobile terminating SMS or MMS traffic is managed by the method and system allowing for one mobile phone number (MSISDN) to be associated with a plurality of wireless devices;

FIG. 1C represents a non-limiting call-flow detailing the means through which the location of a mobile station may be retrieved;

FIG. 1D represents a non-limiting call-flow detailing the means through which an indication of the unsuccessful nature of a SMS delivery attempt will be relayed to a Short Message Service Center (SMSC). FIG. 1D also represents a non-limiting call-flow detailing the means through which the unavailability of a given mobile station may be provided to a given SMSC for subsequent SMS delivery attempts;

FIG. 1F represents a non-limiting call-flow detailing the means through which Unstructured Supplementary Service data (USSD) message handling is accommodated;

FIG. 1G represents a non-limiting call-flow detailing the means through which supplementary service message handling is accommodated; and FIG. 1H represents a non-limiting call-flow detailing the means through which call delivery to a wireless device is accommodated.

DETAILED DESCRIPTION

In the following description, for purposes of explanation and not limitation, specific details are set forth, such as particular embodiments, elements, interfaces, hardware configurations, data structures, software flows, techniques, etc. in order to provide a thorough understanding of the present invention. However, it will be apparent to one skilled in the art that the present invention may be practiced in other embodiments that depart from these specific details. In other instances, detailed descriptions of well known methods, devices, and elements are omitted so as not to obscure the description of the present invention with unnecessary detail.

Figure 1E:
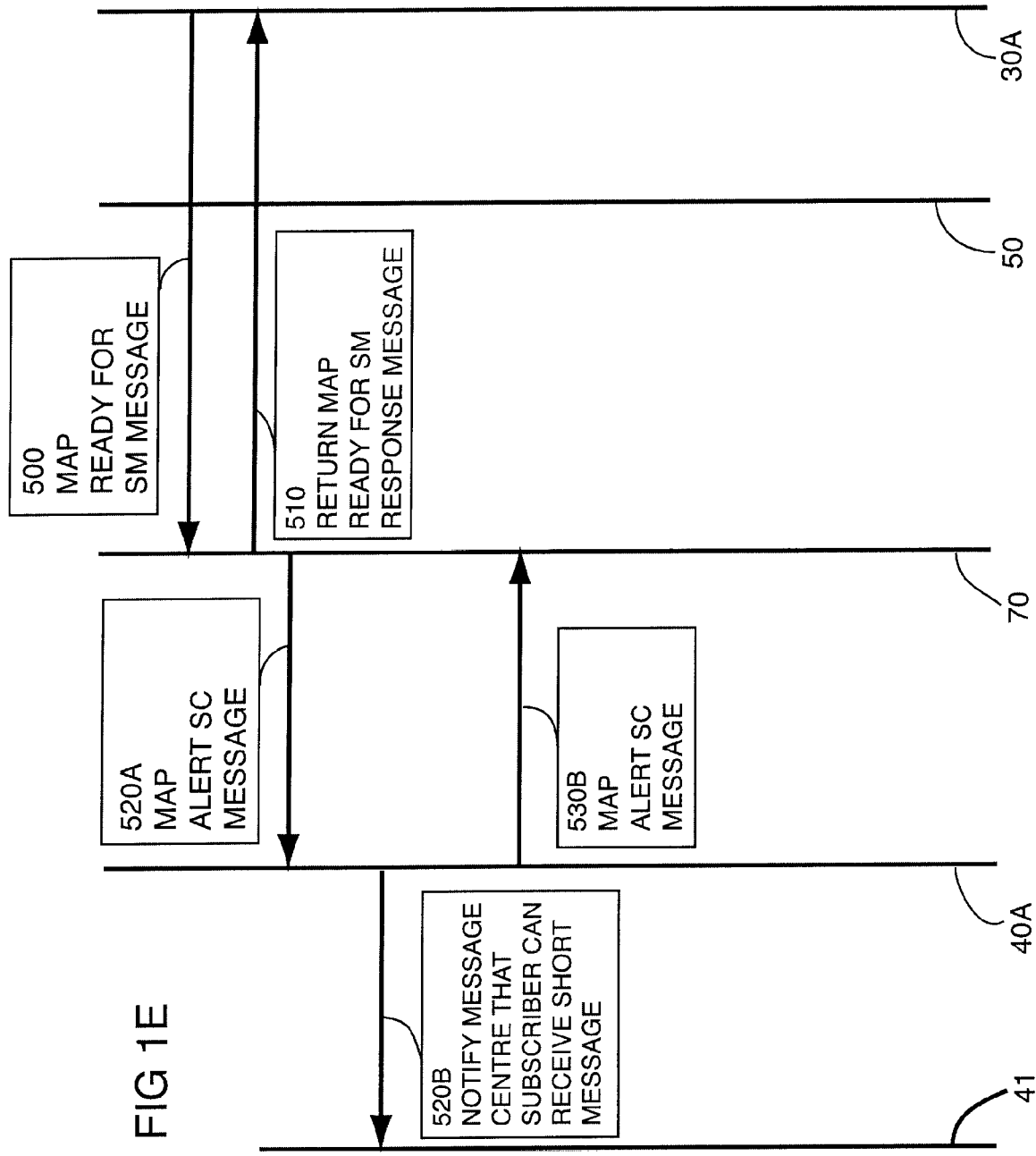
FIG. 1E represents a non-limiting call-flow detailing the means through which an indication of availability (for the purpose of receiving Short Messages) may be relayed to a SMS-C.
Figure 1:
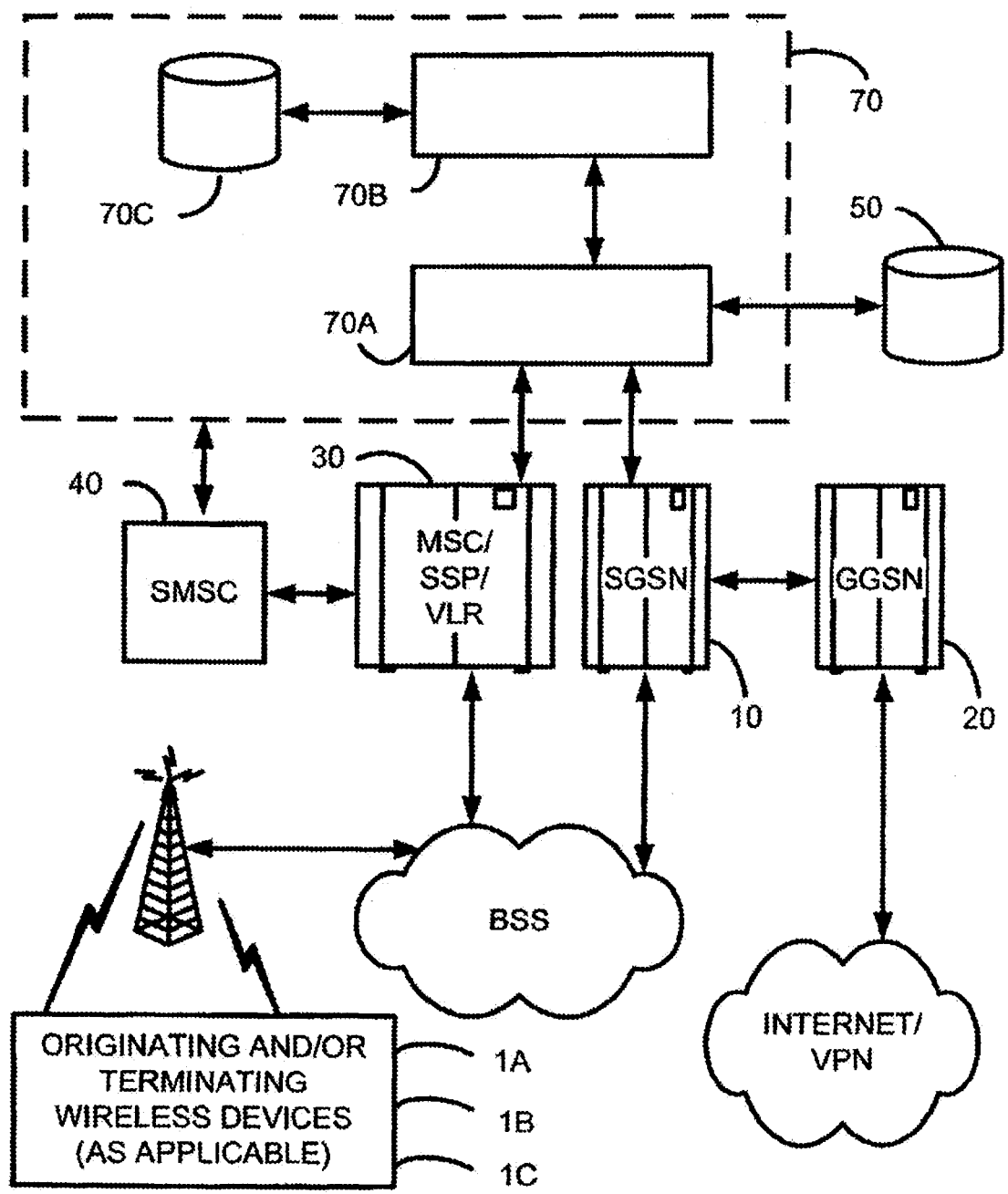
FIG. 1 illustrates a typical, non-limiting embodiment of the system level architecture employed in the disclosure of present.

With reference to FIG. 1, the essential logic 70B for the method and system allowing for one mobile phone number (MSISDN) to be associated with a plurality of wireless devices ('Multi-SIM'), provides the core Mobile Application Part (MAP) intercept function 70 A establishing devices against the Multi-SIM Mobile Station Integrated Services Digital Network (MSISDN) in the network such that outgoing traffic is seen to originate from the Multi-SIM MSISDN. The Multi-SIM product 70 also intercepts incoming traffic to the Multi-SIM MSISDN and directs it to the nominated primary device (1A, 1B, 1C as applicable) for that traffic type. Practitioners and other honorable members skilled in the art will recognize that the primary device need not be bound to one (1) of three (3) selections and may exceed such limitations to the state of the art.

A non-limiting, illustrative list of such MAP messages which will ordinarily be encountered by the Multi-SIM method and system include the messages, including the various parametric attributes, as prescribed in the GSM TS 09.02, ETSI TS100 974, and 3GPP TS 29.002 Mobile Application Part (MAP) specifications as amended from time to time.

Wireless subscribers who obtain the high-level service delineated herein from their respective telecommunications carriers and/or network operators will have a defined number of devices (1A, 1B, 1C and so forth); each device is provisioned in the HLR (Home Location Register) 50 and in the Multi-SIM database 70C. An individual MSISDN is associated with each device (1A, 1B, 1C) in the HLR 50 but is not used outside of the HLR 50 and Multi-Subscriber Identity Module ("Multi-SIM") product 70.

FIGS. 1A, 1B, 1C, 1D, 1E, 1F, 1G, and 1H have been included as variants of FIG. 1 to ease and facilitate instruction, and should be interpreted as aiding and helping to achieve such ends. The labels of FIG. 1 are therefore incorporated by reference.

With reference now to FIG. 1A, the mobile and/or wireless device (1A, 1B, 1C) (among others and as applicable), is activated ('turned on'). After a given wireless device completes any programmed self-check procedure, it will initiate the registration sequence via the applicable air-interface as well as the serving MSC/VLR (Mobile service Switching Center/Visitor Location Register) 30A per steps 100A. The serving MSC/VLR 30A, as per the usual operational processes of a GSM network, normally forwards the MAP Update Location message to the HLR 50 associated with the IMSI'x' of the mobile device's SIM. For the purpose of the disclosed invention, the MAP Update Location message will instead be forwarded to the Multi-SIM product 70 at step 100B. Those skilled in the art shall recognize that there are a variety of mechanisms by which the MAP Update Location message can be forwarded to the Multi-SIM product 70 using the inherent capabilities of the SS7 (Signaling System 7) network and the associated translation capabilities of the serving MSC/VLR 30A. Those skilled in the art will recognize that the Multi-SIM product 70 will appear as a defacto HLR for IMSI'x' from the perspective of the serving MSC/VLR 30A.

After receiving the MAP Update Location message, the Multi-SIM product 70 will store the addressing information of the MSC/VLR 30A associated with IMSI'x'. The Multi-SIM product 70 will also retrieve the address of the HLR 50 associated with IMSI'x' and forward the MAP Update Location message to the appropriate HLR 50 via the SS7 network at step 100C. An optional manifestation of the Multi-SIM product 70 will initiate a MAP version negotiation sequence (not shown) as described in GSM 09.02 (and similar specifications) if the MAP version number of the received message at step 100B is greater than that currently supported by the HLR 50 associated with IMSI'x'. Those skilled in the art will recognize that there are a number of well understood message sequences associated with the MAP version negotiation procedure and that the intent of such a such a procedure is to ensure that subsequent messages received from network elements such as the serving MSC/VLR 30A are set to a MAP version level no higher than the MAP version level supported by the HLR 50 associated with IMSI'x'. The MTP (Message Transfer Part) and SCCP (Signaling Connection Control Part) of the MAP Update Location message forwarded to the HLR 50 at step 100C will be modified by the Multi-SIM product 70 so that the Multi-SIM product 70 will appear as a VLR from the perspective of the HLR 50. Those skilled in the art will recognize that the HLR 50 utilizes received VLR and MSC addressing information in the MAP layer of the Update Location message to invoke service screening criteria as defined by GSM specifications. For example, a VLR or MSC address associated with a given service provider's 'home' network may be accorded different service attributes relative to the VLR and MSC associated with a 'foreign' network. To that end, an optional manifestation of the invention will map the VLR and MSC addressing information received in the MAP layer of the Update Location message to a predefined subset of alternative VLR and MSC addresses in order to invoke an appropriate set of service attributes for the subscribers associated with the Multi-SIM service. Those skilled in the art will recognize that for the aforementioned optional manifestation of the invention that the HLR 50 will have to be configured (typically via translation tables) to apply a specific set of service attributes given the predefined subset of alternative VLR and MSC addresses.

Still in reference to FIG. 1A, the HLR 50 will retrieve the subscriber's profile using IMSI'x' as the index key using established processes commonly implemented by HLR vendors. The subscriber's profile will include, among other subscribed service attributes, the MSISDN'x' associated with IMSI'x'. The HLR 50 will in turn initiate a MAP Insert Subscriber Data sequence, containing the subscribed attributes associated with the subscriber's profile and MSISDN'x', which will be forwarded to the Multi-SIM product 70 via the SS7 network at step 110A. Those skilled in the art shall recognize that the HLR 50 will direct the MAP Insert Subscriber Data sequence to the Multi-SIM product 70 via the SS7 network by virtue of the received MTP and SCCP addressing information received at step Still in reference to FIG. 1A, the MAP Insert Subscriber Data message is received from the HLR 50 by the art of the Multi-SIM product 70 (specifically 70A) at 110A. Using said IMSI'x' as an index key, the Primary MSISDN is retrieved (not shown) from an internal database/table 70C (via 70B). An optional manifestation of the invention will store the status of the wireless device associated with IMSI'x' in the application memory or internal database 70C for the purpose of applying optional routing procedures for outgoing and incoming as noted in a subsequent portion of this disclosure. Yet another optional manifestation of the invention will store selected attributes associated with Intelligent Network (IN) services in application memory or internal database 70C. Those skilled in the art will recognize that there are a variety of IN services which are defined by various specifications which serve the similar purposes without diluting the intent and scope of the present invention including those associated with CAMEL (Customized Applications for Mobile Network Enhanced Logic) and CS-1 (Capability Set 1) as well as derivations thereof.

Still in reference to FIG. 1A, the Multi-SIM product 70 will generate an MAP Insert Subscriber Data message where the MSISDN 'x' received from the HLR 50 will be replaced by the Public (or primary) MSISDN retrieved from the Multi-SIM internal database 70C. The Multi-SIM product 70 will forward the MAP Insert Subscriber Data message to the serving MSC/VLR 30A via the SS7 network at step 110B. Those skilled in the art will recognize that a characteristic of the invention is that the MAP Insert Subscriber Data received by a MSC/VLR 30A always contains the Public MSISDN regardless of which IMSI'x' (and corresponding SIM and wireless device) was activated.

Still in reference to FIG. 1A, after the serving MSC/VLR 30A processes the information received via the MAP Insert Subscriber Data message received at step 110B, the serving MSC/VLR 30A generates and forwards a MAP Insert Subscriber Data acknowledgement message to the Multi-SIM product 70 at step 120A. At step 120B, the Multi-SIM product 70 will forward a MAP Insert Subscriber Data acknowledgement message to the HLR 50 modifying the MTP, SCCP, Transaction Capability Application Part (TCAP), and MAP layers of the message relative to that received at step 120A as required. For example, the Primary MSISDN will be replaced by MSISDN'x'. The HLR 50 will receive the MAP Insert Subscriber Data message and generate an MAP Update Location acknowledgement message using established processes commonly implemented by HLR vendors. The HLR 50 will forward the MAP Update Location acknowledgement message to the Multi-SIM at step 130A. The serving MSC/VLR 30A will receive the MAP Update Location acknowledgement message and initiate an appropriate confirmation message to the wireless device 1 'x' at step 130B. At step 130C, the serving MSC/VLR will complete the registration sequence with the mobile station.

Still in reference to FIG. 1A, a mobile originated call may then be established at step 140A. The MSC/VLR 30A will initiate a call to the intended destination address via the Public Switched Telephone Network (PSTN) using the procedures prescribed using the ISDN User Part (ISUP) protocol at step 140B. A characteristic of the disclosed invention is that the Calling Party Number information associated with the call establishment procedure will be set to the primary MSISDN forwarded to the serving MSC/VLR 30A by the Multi-SIM product 70 at step 110B.

Still in reference to FIG. 1A, those skilled in the art will recognize that a similar sequence will be invoked for GPRS (General Packet Radio Service) registration scenarios. In particular, a characteristic of the disclosed invention is that the Primary MSISDN identifier will be associated with a given IMSI'x' for the PDP (Packet Data Protocol) Context Activation establishment procedure.

Still in reference to FIG. 1A, an optional manifestation of the Multi-SIM product 70 may selectively screen outgoing call attempts by utilizing procedures associated with IN services. In particular, an IN message (e.g. CAMEL INITIAL_DP) originated from the serving MSC/VLR 30A will indicate a call attempt being made by a mobile station 1A, 1B, 1C. The Multi-SIM product 70 may invoke screening criteria based on the destination and source address information contained in the IN message. The Multi-SIM product 70 may also invoke incremental screening criteria based on the state of a given mobile device (associated with IMSI'x') as stored in the Multi-SIM database 70C (not shown). For example, the Multi-SIM product 70 may use screening criteria to limit the number of simultaneous calls or to redirect calls to an alternative destination address. The Multi-SIM product 70 will instruct the serving MSC/VLR 30A via an appropriate IN message (e.g. CAMEL CONTINUE or CAMEL CONNECT or CAMEL CANCEL) as to the appropriate course of action based on the screening criteria. Those skilled in the art will recognize that the optional manifestation of the Multi-SIM product 70 will provide functionality commonly associated with a Service Control Point (SCP). Those skilled in the art will also recognize that there are a variety of IN protocols which are defined by various specifications which serve the similar purposes without diluting the intent and scope of the present invention including those associated with CAMEL and CS-1 (Capability Set 1) as well as derivations thereof. Another optional manifestation of the Multi-SIM product 70 may act as an intermediation gateway between the serving MSC/VLR 30A and a given Service Control Point (not shown) for the purpose of ensuring the seamless support of IN services supported by the Service Control Point (not shown).

Now with reference to FIG. 1B, where the respective Short Message (SM) stored in SMS-C 40 remains to be delivered. Those skilled in the art will recognize that the Short Message may also consist of a Multi-Media or voice-mail alerting message. The SMS-C will generate and forward a MAP SEND-ROUTING-INFO-FOR-SM (SRI for SM) message which will be directed to the Multi-SIM. Those skilled in the art shall recognize that there are a variety of mechanisms by which the MAP SRI for SM message can be forwarded to the Multi-SIM product 70 using the inherent capabilities of the SS7 network and the associated translation capabilities of the SMS-C 40. Those skilled in the art will recognize that the Multi-SIM product 70 will appear as a defacto HLR for a given Primary MSISDN from the perspective of the SMS-C 40.

Still in reference to FIG. 1B, the Multi-SIM product 70 will retrieve the subscriber's service profile using the Primary MSISDN as the index key from an internal database/table 70C (not shown). The service profile will contain, among other attributes, information pertaining to the specific routing preferences for Short Message as well as Multi-Media Messages and Voice-Mail alerts as the case may be. The Multi-SIM product 70 will generate and forward a MAP SRI for SM response message to the SMS-C 40 at step 210. The MAP SRI for SM response message will contain information so that the SMS-C will consider the Multi-SIM product 70 as the serving MSC for the purpose of Short Message delivery. For example, the Network Node Number parameter will contain an identifier which will uniquely identify the Multi-SIM product 70 as the serving MSC for the purpose of Short Message delivery. Those skilled in the art will recognize that the MAP SRI for SM response message at step 210 will contain other parameters so that the SMS-C will be able to continue processing the delivery of the Short Message. For example, the MAP SRI for SM message will contain an IMSI value which can be selected from the set of IMSI'x' associated with the Primary MSISDN or set to a configurable range of values. Those skilled in the art will recognize that the Multi-SIM product 70 will appear as a defacto VLR from the perspective of the SMS-C 40.

Still in reference to FIG. 1B, at step 220, the SMS-C will attempt delivery of the message by generating and forwarding a MAP MT-FORWARD-SHORT-MESSAGE (MT FSM) message to the Multi-SIM product 70. At step 230, the Multi-SIM 70 will determine the appropriate mobile device (as identified by the IMSI'x' associated with a given SIM and mobile device respectively) to receive the Short Message based on a number of factors including the source address contained in the MT FSM message as well as the nature of the message (e.g. short message Now with reference to FIG. 1C, a Location Client 80 will initiate a location retrieval request via an Application Programming Interface (API) at 300A which will include a number of parameters including but not limited to the Primary MSISDN and a transaction identifier. In lieu of a Primary MSISDN, the Location Client may provide a pseudonym which can be correlated to the Primary MSISDN. The purpose of the transaction identifier being to uniquely correlate a given request with other messages which may be received asynchronously including, but not limited to, a confirmation response. Practitioners skilled in the art shall recognize that a variety of object oriented application programming interfaces (e.g. Common Object Request Broker Architecture (CORBA) or Extensible Markup Language (XML)) may be used.

Still in reference to FIG. 1C, at step 300B, the Gateway Mobile Location Centre (GMLC) 81 will receive the location retrieval request. The GMLC 81 will initiate a MAP ANY-TIME-INTERROGATION (ATI) sequence to the Multi-SIM product 70. Those skilled in the art shall recognize that there are a variety of mechanisms by which the MAP ATI message can be forwarded to the Multi-SIM product 70 using the inherent capabilities of the SS7 network and the associated translation capabilities of the GMLC 81. Those skilled in the art will recognize that the Multi-SIM product 70 will appear as a defacto HLR for IMSI'x' from the perspective of the GMLC 81. Those skilled in the art will recognize that the functionality of the GMLC is generally defined by a variety of specifications including GSM 03.71 and 3GPP 23.071 as amended from time to time and that modifications to the capabilities of the GMLC as prescribed by the noted specifications does not dilute the intent and scope of the present invention. A characteristic of the disclosed invention is that the location of a given mobile terminal can be retrieved without sending messages to the HLR 50. Those skilled in the art will recognize that the Multi-SIM product 70 effectively emulates certain capabilities associated with the HLR for the purpose of retrieving the location associated with a mobile station. or alert). Note that the Multi-SIM product 70 may use a variety of techniques in order to determine the appropriate mobile device based on either programmatic methods (for example, the last device that registered may be used to forward all short messages) or based on pre-established criteria as provided by the subscriber (for example, the subscriber may send Short Messages and alert messages to different devices based on the relative capabilities supported on each device). The programmatic methods may in turn be affected by the state of each device (e.g. whether a given mobile device is engaged in a call or registered). Those skilled in the art will recognize that a variety of techniques may be used in order to determine the destination mobile device without diluting the intent and scope of the present invention. A characteristic of the disclosed invention is that telecommunication services can be selectively terminated to the plurality of mobile devices based on a number of programmatic techniques as well as pre-configured routing criteria.

Still in reference to FIG. 1B, at step 230, the Multi-SIM product 70 will generate and forward a MT FSM to the serving MSC/VLR 30A associated with the IMSI'x' of the selected mobile station, modifying the MTP, SCCP, TCAP, and MAP layers of the message relative to that received at step 230 as required. Those skilled in the art will recognize that the Multi-SIM product 70 will appear as a defacto SMS-C from the perspective of the serving MSC/VLR 30A. At step 240, the short message will be delivered to the mobile station 1A, 1B, 1C (among others and as applicable) associated with IMSI'x'. At step 250, a MAP MT FSM response message containing an indication of the successful or unsuccessful nature of the delivery attempt will be initiated by the serving MSC/VLR 30A and forwarded to the Multi-SIM product 70. At step 260, the Multi-SIM product 70 will generate and forward a MT FSM response to the appropriate SMS-C 40, modifying the MTP, SCCP, TCAP, and MAP layers of the message relative to that received at step 250 as required.

Still in reference to FIG. 1C, at step 300C, the Multi-SIM product 70 will retrieve the subscriber's service profile using the Primary MSISDN as the index key from an internal database/table 70C (not shown). The service profile will contain, among other attributes, information pertaining to the specific preferences for location retrieval, the last known location of the device based on previous location retrieval attempts, as well as the current list of active or registered devices (as identified via the IMSI'x' identifier associated with a given SIM and mobile device respectively). The Multi-SIM product 70 will determine the appropriate mobile device (as identified by the IMSI'x' associated with a given SIM and mobile device) for the purpose of a location query based on a number of factors including the source address contained in the MAP ATI message. The Multi-SIM product 70 may use a variety of techniques in order to determine the appropriate mobile device for the location query based on either programmatic methods (for example, the last device that registered) or based on pre-established criteria as provided by the subscriber (for example, the subscriber may rank order a number of devices to be located in preferential order). The programmatic methods may in turn be affected by the state of each device (e.g. whether a given mobile device is engaged in a call or registered). Those skilled in the art will recognize that a variety of techniques may be used in order to determine the mobile device for a location query without diluting the intent and scope of the present invention. The Multi-SIM product 70 will initiate a MAP PROVIDE-SUBSCRIBER-Info (PSI) message towards the appropriate serving MSC/VLR 30A based on the selected mobile station (which is associated with a given IMSI(x)) modifying the MTP, SCCP, TCAP, and MAP layers of the message relative to that received at step 300B as required. Upon receipt of the MAP PSI message, the serving MSC/VLR 30A will retrieve the location of the mobile station. The mechanisms of retrieving the location of the mobile station are generally prescribed by a variety of specifications including GSM 03.71 and 3GPP 23.071 as amended from time to time.

Still in reference to FIG. 1C, at step 310A a MAP PSI response message will be initiated by the serving MSC/VLR 30A which will contain the location of the mobile terminal.

The MAP PSI response message will be forwarded to the Multi-SIM product 70. At step 310B, the Multi-SIM product 70 will generate and forward a MAP ATI response to the GMLC 81, modifying the MTP, SCCP, TCAP, and MAP layers of the message relative to that received at step 310A as required. An optional manifestation of the Multi-SIM product 70 will store the location of mobile station (associated with IMSI'x') in the internal database/table 70C (not shown). At step 310C, the GMLC 81 will provide the location information to the Location Client 80 via the API. Those skilled in the art will recognize that an optional manifestation of the Multi-SIM product 70 may abbreviate the location retrieval attempt by providing location information associated with previous location attempts. This will effectively result in steps 300C and 310A being bypassed. The retrieval and provision of stored location information is governed by programmatic control and there are a number of procedures and conditions (for example, time based methods) which may be applied to abbreviate the location retrieval process.

Now with reference to FIG. 1D, where a SMS delivery report associated with a SMS delivery attempt is to be forwarded to the appropriate Short Message Service Center (SMS-C). At step 400A, a MAP MT-FORWARD-SHORT-MESSAGE (MT FSM) response message containing an indication of the unsuccessful nature of the delivery attempt will be initiated by the serving MSC/VLR 30A and forwarded to the Multi-SIM product 70. Those skilled in the art will recognize that the Multi-SIM product 70 will appear as a defacto SMS-C from the perspective of the serving MSC/VLR 30A based on the intermediation of registration and SMS delivery sequences previously described. At step 400B, the Multi-SIM product 70 will generate and forward a MT FSM response to the appropriate SMS-C 40, modifying the MTP, SCCP, TCAP, and MAP layers of the message relative to that received at step 400A as required.

Still in reference to FIG. 1D, at step 410, the SMS-C 40A will initiate a MAP REPORT-SM-DELIVERY-STATUS which will contain a number of parameters including the Primary MSISDN and Service Center address and which will be forwarded to the Multi-SIM product 70. Those skilled in the art will recognize that the Multi-SIM product 70 will appear as a defacto HLR for a given Primary MSISDN from the perspective of the SMS-C 40A. To that end, the Multi-SIM product 70 will emulate the capabilities associated with a HLR 50 for the purpose of setting and maintaining the Message Waiting Data file for the Primary MSISDN. The Message Waiting Data file can be implemented via a variety of mechanisms without diluting the intent and scope of the present invention. For example, the Message Waiting Data file can be stored as a multi-element data element in the Multi-SIM database 70C (as indexed by the Primary MSISDN). Those skilled in the art will recognize that the intent of the Message Waiting Data file in the HLR, among other functions, is to record the address of SMS-Cs for subsequent notification once a given mobile station is deemed active (registers). At step 420A, the Multi-SIM product 70 will initiate a MAP REPORT-SM-DELIVERY-STATUS response message to the SMS-C 40A indicating that the SMS-Cs address has been stored. At step 420B, the SMS-C 40A may provide an indication of the unsuccessful delivery attempt to the Message Center 41A.

Still in reference to FIG. 1D, at step 430A, a Message Center 41B may attempt to deliver a Short Message to the a given subscriber as identified by the Primary MSISDN. At step 430B, the SMS-C 40B will generate and forward a SRI for SM message which will be directed to the Multi-SIM product 70. Those skilled in the art shall recognize that there are a variety of mechanisms by which the MAP SRI for SM message can be forwarded to the Multi-SIM product 70 using the inherent capabilities of the SS7 network and the associated translation capabilities of the SMS-C 40. The Multi-SIM product 70 will retrieve the subscriber's service profile and the Message Waiting Data file using the Primary MSISDN as the index key from an internal database/table 70C (not shown). The service profile will contain, among other attributes, information pertaining to the specific routing preferences for Short Message as well as Multi-Media Messages and Voice-Mail alerts as the case may be. As the Message Waiting File will indicate that the mobile station is not active/registered, the Multi SIM platform 70 will generate and forward a MAP SRI for SM response message to the SMS-C 40B at step 440 which will indicate that the subscriber is absent (typically by sending the User Error parameter to 'Absent Subscriber_SM')

Still in reference to FIG. 1D, at step 450, the SMS-C 40B will initiate a MAP REPORT-SM-DELIVERY-STATUS which will contain a number of parameters including the Primary MSISDN and Service Center address and which will be forwarded to the Multi SIM platform 70. At step 460, the Multi-SIM product 70 will initiate a MAP REPORT-SM-DELIVERY-STATUS response message to the SMS-C 40B indicating that the SMS-Cs address has been stored.

Now with reference to FIG. 1E, which illustrates the intercept of the MAP READY FOR SM operation generally used by the MSC/VLR 30A if a subscriber, whose message waiting flag is active in the VLR, has re-established radio contact with the network or has memory available. At step 500, the MSC/VLR 30A generates MAP READY FOR SM message which is forwarded to the Multi-SIM product 70. Those skilled in the art will recognize that the Multi-SIM product 70 will appear as a defacto HLR for a given IMSI'x' from the perspective of the MSC/VLR 30A. The MAP READY FOR SM message will contain several parameters indicating if the mobile subscriber is present or if the mobile station has memory. At step 510, the Multi-SIM will generate and forward a MAP READY FOR SM response message to the MSC/VLR 30A indicating that the message at step 500 has been received and processed successfully.

Still in reference to FIG. 1E, the Multi-SIM product 70 will retrieve the subscriber's service profile using the IMSI'x' as the index key from an internal database/table 70C (not shown). The service profile will contain, among other attributes, information pertaining to the specific routing preferences for Short Message as well as Multi-Media Messages and Voice-Mail alerts as the case may be. The service profile will contain the Primary MSISDN associated with IMSI'x' which will in turn be used to index the Message Waiting Data elements. Based on the information retrieved, the Multi-SIM will determine which SMS-C should be contacted. Those skilled in the art will recognize that the Multi-SIM product 70 may use a variety of techniques in order to determine the appropriate SMS-C based on the information contained in the internal database/table 70C (not shown). In particular, the Multi-SIM product 70 may determine that a SMS-C may not be contacted based on the routing preferences prescribed by the subscriber. Alternatively, the Multi-SIM product 70 may determine that several SMS-Cs (not shown) should be contacted. At step 520A, the Multi-SIM product 70 will generate and forward a MAP ALERT-SERVICE-CENTRE (Alert SC) to the selected SMS-C 40A (or SMS-Cs (not shown)) indicating that a given subscriber (as identified by the Primary MSISDN) is ready to receive Short Messages. At step 520B, the SMS-C may alert Message Centers to the effect that a given subscriber may receive Short Messages.

Still in reference to FIG. YE, at step 530B, the SMS-C 40A will generate and forward a MAP Alert SC response message to the Multi-SIM product 70 indicating that the MAP Alert SC message was received and processed successfully. At this point in time, the SMS-C 40 may initiate the short message delivery mechanisms as described earlier in the text associated with FIG. 1B.

Still in reference to FIG. 1E, those skilled in the art will recognize that other mechanisms including the registration process described in FIG. 1A may invoke the MAP Alert SC sequence described at step 520A.

Now with reference to FIG. 1F, USSD MAP messages are typically routed to and from the USSD Application via the serving MSC/VLR and HLR using the methods, operations, and protocols specified in GSM 03.90 and GSM 09.02 as amended from time to time. An optional manifestation of the invention provides an USSD-based subscriber interface to change default routing preferences of Multi-SIM subscribers. The Multi-SIM product 70 will also permit subscribers and network operators to make configuration changes via a (web-based) provisioning interface.

Still with reference to FIG. 1F, at step 600, a subscriber may invoke an Unstructured Supplementary Service Data (USSD) service by keying in a USSD short code (e.g. *XX#). This will invoke a USSD Message (e.g. MAP PROCESS_UNSTRUCTURED_SS_REQUEST (PUSSR)) which will be forwarded to the Multi-SIM product 70 using the inherent capabilities of the SS7 network and the associated translation capabilities of the serving MSC/VLR 30A. At step 610, the Multi-SIM product 70 may recognize that the USSD short code (as provided via the USSD String parameter) matches a prescribed code associated with the invocation of a feature of the Multi-SIM service. Example services include modifying the routing behavior of the Multi-SIM service for received voice or messaging traffic or obtaining information pertaining to the current settings of the Multi-SIM product 70 for the subscriber. At step 610, the Multi-SIM product 70 initiates a MAP USSD response message. The MAP USSD response message may contain text which indicates that the requested feature was invoked successfully or requested information pertaining to the status of the Multi-SIM service. At step 610, the MSC/VLR will relay the information to the mobile station per the processes described in GSM 03.90 and GSM 09.02.

Still with reference to FIG. 1F, at steps 620A, 620B, 630, a USSD message which is not associated with a Multi-SIM service or feature is propagated to the USSD Based Application 90 via the Multi-SIM product 70 and HLR 50. At step 620B, the Multi-SIM product 70 modifies the SCCP, TCAP, and MAP layers of the message relative to that received at step 620A as required. Those skilled in the art will recognize that the Multi-SIM product 70 will appear as a defacto HLR for IMSI'x' (or the Primary MSISDN) from the perspective of the MSC/VLR 30—and that the Multi-SIM product 70 will appear as a defacto MSC/VLR for IMSI'x' (or MSISDN'x') from the perspective of the HLR 50. At steps 630, 640A, 640B, an USSD response message initiated from the USSD Based Application 90 and is propagated to the serving MSC/VLR 30A via the HLR 50 and Multi-SIM product 70. At step 640B, the Multi-SIM product 70 modifies the SCCP, TCAP, and MAP layers of the message relative to that received at step 640A as required. At step 640B, the MSC/VLR will relay the information to the mobile station per the processes described in GSM 03.90 and GSM 09.02.

Now with reference to FIG. 1G, Supplementary services (e.g. call forwarding services) are typically modified (in order to activate, deactivate, register, erase, or check the status of supplementary services as the case may be) via MAP messages between the MSC and the VLR and between the VLR and the HLR using the methods, operations, and protocols specified in GSM 09.02 as amended from time to time. At step 700, a subscriber may invoke a command via the Man Machine Interface (MMI) of his/her mobile terminal in order to modify a supplementary service. This will invoke a Supplementary Service MAP message (e.g. MAP ACTIVATE_SS) which will be forwarded to the Multi-SIM product 70 using the inherent capabilities of the SS7 network and the associated translation capabilities of the serving MSC/VLR 30A. The Multi-SIM product 70 will retrieve the subscriber's service profile from an internal database/table 70C (not shown). The service profile will contain, among other attributes, the complete range of terminal information associated with the subscriber—including the entire suite of IMSI'x' and MSISDN'x' information associated with the subscriber. At steps 710, 730, and 750 the Multi-SIM 70 will propagate the appropriate Supplementary Service MAP message to the HLR(s) 50 associated with a given IMSI'x' for each device 1A, 1B, 1C as applicable (in particular, each IMSI'x' may be associated with a different HLR). Practitioners skilled in the art will recognize that the number of devices need not be bound to one (1) of three (3) selections and may exceed such limitations to the state of the art. At steps 720, 740, and 760 the HLR(s) will generate and initiate appropriate Supplementary Service MAP response messages which will be forwarded to the Multi-SIM product 70. At step 770, once the Multi-SIM product 70 has received confirmation that the required supplementary service command has been carried out successfully, the appropriate Supplementary Service MAP response message will be generated and forwarded to the Serving MSC/VLR 30A. At step 770, if one of the responses from the HLR indicates an unsuccessful attempt, a Supplementary Service MAP response message indicating an unsuccessful attempt will be provided to the serving MSC/VLR 30A. An optional manifestation of the invention may roll-back the settings associated with a given supplementary service by invoking the complementary Supplementary Service command (e.g. a DEACTIVATE_SS message to counter a prior ACTIVATE_SS message) (not shown). The optional manifestation of the invention will retrieve the status of a given Supplementary Service setting via the MAP INTERROGATE_SS message (not shown) prior to invoking the subscriber command at steps 710, 730, 750.

Now with reference to FIG. 1H, at step 800A, a call will be received by the Gateway MSC 30C from the PSTN 95. At step 800B, the Gateway MSC 30C will generate and forward a MAP SEND_ROUTING_INFORMATION (SRI) message to the Multi-SIM product 70. The Multi-SIM product 70 will retrieve the subscriber's service profile using the Primary MSISDN as the index key from an internal database/table 70C (not shown). The service profile will contain, among other attributes, information pertaining to the specific preferences for call delivery, the last known location of the device based on previous location retrieval attempts, as well as the current list of active or registered devices (as identified via the IMSI'x' identifier associated with a given SIM and mobile device respectively). The Multi-SIM product 70 may use a variety of techniques in order to determine the appropriate mobile device (as identified by the IMSI'x' associated with a given SIM and mobile device) for call delivery based on either programmatic methods (for example, the last device that registered) or based on pre-established criteria as provided by the subscriber (for example, the subscriber may rank order a number of devices for call delivery in preferential order). The programmatic methods may in turn be affected by the state of each device (e.g. whether a given mobile device is engaged in a call or registered). At step 800C, an optional manifestation of the Multi-SIM product 70 will confirm the status of the selected mobile station by initiating a MAP PROVIDE-SUB-SCRIBER-Info (PSI) message to the serving MSC/VLR 30A. At step 810, the serving MSC/VLR 30A will provide a MAP PSI response message containing the status of the mobile station. Depending on the nature of the status information received, the Multi-SIM product 70 may select an alternative mobile station and confirm the status of the alternative mobile station (not shown) (in effect, steps 800C and 810 will be repeated). This process will continue until a suitable mobile station (as identified by IMSI'x') is determined to be available for the purpose of receiving a call. At step 820, once a suitable mobile station is selected, the Multi-SIM product 70 will generate a MAP SRI message and forward it to the HLR. At step 830, the HLR 50 will generate a MAP PROVIDE_ROAMING_NUMBER (PRM) message and forward it to the Multi-SIM product 70. At step 840, the Multi-SIM product 70 will forward the MAP PRM message to the serving MSC/VLR 30A modifying the MTP, SCCP, TCAP, and MAP layers of the message relative to that received at step 830 as required. At step 850, the serving MSC/VLR 30A will generate and forward a MAP PRM response message containing the roaming number to the Multi-SIM product 70. At step 860, the Multi-SIM product 70 will forward the MAP PRM response message to the serving HLR 50 modifying the MTP, SCCP, TCAP, and MAP layers of the message relative to that received at step 850 as required. At step 870A, the HLR will generate and forward a MAP SRI response message to the Multi-SIM product 70 containing the roaming number. At step 870B, the Multi-SIM product 70 will forward the MAP SRI response to the Gateway MSC 30C modifying the MTP, SCCP, TCAP, and MAP layers of the message relative to that received at step 870A as required.

Still in reference to FIG. 1H, the Gateway MSC 30C will establish a call to the serving MSC/VLR 30A via the PSTN using the routing number received at step 870B. A characteristic of the disclosed invention is that the incoming calls can be selectively prioritized based on a number of attributes including the state of each mobile device (as identified by IMSI'x') and the prescribed routing preferences of the subscriber. Those skilled in the art will recognize that the Multi-SIM product 70 will appear as a defacto HLR for a Primary MSISDN or IMSI'x' from the perspective of the Gateway MSC 30C and the serving MSC/VLR 30A respectively. Those skilled in the art will recognize that the Multi-SIM product 70 will appear as a defacto Gateway MSC and serving MSC/VLR for a MSISDN'x' and IMSI'x' from the perspective of the HLR 50.

Still in reference to FIG. 1H, an optional manifestation of the Multi-SIM product 70 may act as an intermediation gateway between the serving Gateway MSC 30C and a given Service Control Point (not shown) for the purpose of ensuring the seamless support of IN services supported by the Service Control Point (not shown).

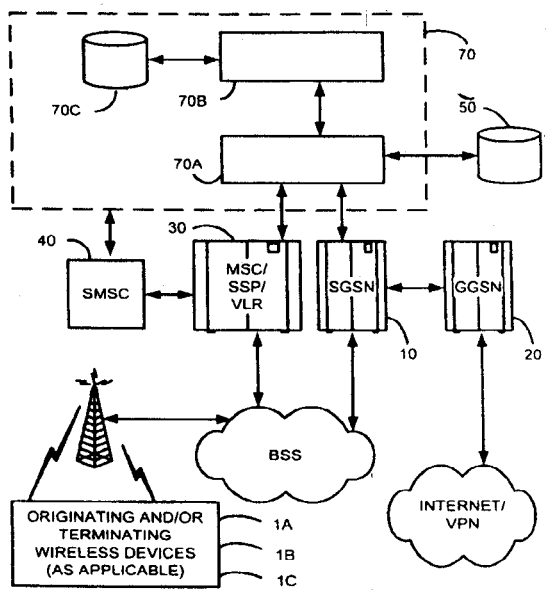

What is claimed is:

1. A method for routing incoming communications in a communications network comprising a plurality of network elements in which a primary addressable number is associated with a plurality of communications devices each having a unique identifier associated therewith, the method comprising:

receiving at a first one of said network elements an incoming communication addressed to a communications device in the plurality of communications devices, the incoming communication having addressing information including the primary addressable number;

retrieving at a discrete network element that emulates at least one of said plurality of network elements, a subscriber service profile associated with the primary addressable number;

determining, at said discrete network element, from the plurality of communications devices associated with the primary addressable number an appropriate communications device for delivery of the incoming communication based on pre-established criteria in the subscriber service profile;

forwarding an identity of the appropriate communications device from said discrete network element to said first one of said network elements; and transmitting the incoming communication to the appropriate communications device.

2. The method as claimed in claim 1, wherein the subscriber service profile comprises preferences for delivery of incoming communications, a last location of each communications device based on previous location retrieval attempts, and a list of active or registered communications devices in the plurality of communications devices.

3. The method as claimed in claim 1, wherein the pre-established criteria includes a preferential order of the communications devices for delivery of incoming communications.

4. The method as claimed in claim 1, wherein the step of determining the appropriate communications device for delivery of the incoming communication includes steps of:

(i) selecting a communications device from among the plurality of communications devices associated with the primary addressable number in dependence on the pre-established criteria;

(ii) determining if the selected communications device is available or unavailable to receive the incoming communication;

(iii) if the selected communications device is available to receive the incoming communication, designating the selected communications device as the appropriate communications device; and (iv) if the selected communications device is unavailable to receive the incoming communication, (a) selecting an alternative communications device from among the plurality of communications devices associated with the primary addressable number in dependence on the pre-established criteria, (b) determining if the selected alternative communications device is available or unavailable to receive the incoming communication and if the selected alternative communications device is available to receive the incoming communication, designating the selected alternative communications device as the appropriate communications device.

5. The method as claimed in claim 4, wherein in step (iv) the selected communications device is unavailable if the selected communications device is unregistered.

6. The method as claimed in claim 4, wherein the step of determining the appropriate communications device for delivery of the incoming communication further includes:

(v) if the selected alternative communications device is unavailable, repeating steps (iv-a) and (iv-b) until an appropriate communications device has been designated or until all communications devices in the plurality of communications devices have been determined to be unavailable; and (vi) if all the communications devices in the plurality of communications devices have been determined to be unavailable, then designating an address for delivery of the incoming communication, wherein the address has been specified in the subscriber service profile.

7. The method as claimed in claim 4, wherein step (ii) includes determining if the selected communications device is registered or unregistered by:
   sending an interrogation;
   determining based on the presence or absence of an appropriate reply to the interrogation if the selected communications device is registered or unregistered, respectively.

8. The method as claimed in claim 1, wherein the incoming communication is received from a telephony service, a text message service, a Multi-Media Message Service (MMS), or a Message Waiting Indicator (MWI) service, and the appropriate communications device is selected in dependence on the type of service that the incoming communication is received from.

9. The method as claimed in claim 1, wherein the communications network routes different types of communications and the pre-established criteria for determining the appropriate communications device for delivery includes routing preferences based on the type of the incoming communication.

10. The method as claimed in claim 1, wherein the communications network includes a Global System for Mobile Communications (GSM) network, the primary addressable number includes a Mobile Subscriber Integrated Services Digital Network Number (MSISDN), and each of the communications devices is associated with an International Mobile Station Identifier (IMSI).

11. The method as claimed in claim 10, wherein each registered communications device has a unique device MSISDN and each registered communications device is associated with the primary MSISDN by a network element and is associated with the device MSISDN by said Home Location Register (HLR), including:
   when addressing information of a communication for transmission to the HLR refers to the primary MSISDN, modifying at the discrete network element the addressing information to refer to the device MSISDN of the registered communications device, a reply from the HLR including the device MSISDN of the registered communications device in its addressing information;
   when addressing information of a communication for transmission to the network element refers to the device MSISDN of the registered communications device, modifying at the discrete network element the addressing information to refer to the primary MSISDN, a reply from the network element including the primary MSISDN in its addressing information.

12. The method of claim 11, wherein the network element includes at least one of a Mobile service Switching Center (MSC), a Visitor Location Register (VLR), a Gateway Mobile Location Center (GMLC), and a Short Message Service Center (SMS-C).

13. The method as claimed in claim 11, wherein the addressing information of a communication for transmission to the network element or HLR is modified by modifying the Message Transfer Part (MTP), Signaling Connection Control Part (SCCP), Transaction Capability Application Part (TCAP), and Mobile Application Part (MAP) layers of the communication.

14. A method for limiting access to communications services in a communications network comprising a plurality of network elements and in which a primary addressable number is associated with a plurality of communications devices, each communications device having a unique identifier associated therewith, comprising:
   receiving from a first one of said network elements, at a discrete network element separate from said network elements and which emulates at least one of said network elements, a request for access to a communication service from one of the communications devices associated with the primary addressable number;
   determining, at said discrete network element separate from said network elements, a status of the plurality of mobile communications devices associated with the primary addressable number and the status of the communications services currently being used thereby via a plurality of queries from said discrete network element to one or more of the other network elements using addressable numbers associated with said communications devices;
   granting or denying the communication service for which the access was requested in dependence on the determined status.

15. The method as claimed in claim 14, wherein the status of the plurality of communications devices and the communication services currently used thereby is determined using current network registration information for the plurality of communications devices, information about network traffic relating to the establishment or termination of communications sessions by the plurality of communications devices, and interrogation of the state of a mobile communications device where the state of the mobile communications device is ambiguous based on the current network registration information and network traffic information.

16. The method as claimed in claim 15, wherein interrogation of the state of a mobile communications device includes:
   (i) sending an interrogation; and
   (ii) determining based on the presence or absence of an appropriate reply to the interrogation whether the mobile service is being accessed by the mobile communications device.

17. The method as claimed in claim 16, wherein the primary addressable number is a Mobile Subscriber Integrated Services Digital Network Number (MSISDN), and the unique identifier of each of the communications devices includes an International Mobile Station Identifier (IMSI), and sending an interrogation to a communications device includes:
   (a) retrieving the IMSI of the communications device to be interrogated using the primary MSISDN;
   (b) sending the interrogation using the IMSI of the mobile communications device to be interrogated.

18. The method as claimed in claim 14 including providing intermediation gateway services between a first network element and a second network element for providing seamless support to the first network element for intelligent network (IN) services supported by the second network element.

19. The method as claimed in claim 18 wherein the first network element includes at least one of a Mobile service Switching Center (MSC) and a Visitor Location Register (MSCNLR), and the second network element includes a Service Control Point (SCP).

20. The method as claimed in claim 14 wherein the communications network includes a Global System for Mobile Communications (GSM) network, the primary addressable number includes a Mobile Subscriber Integrated Services Digital Network Number (MSISDN), and each of the communications devices includes an International Mobile Station Identifier (IMSI) and a unique device MSISDN associated therewith.

21. A method for processing a location retrieval request in a Global System for Mobile Communications (GSM) network in which a primary Mobile Subscriber Integrated Services Digital Network Number (MSISDN) is associated with a plurality of mobile communications devices, each mobile communications device including a Subscriber Identity Module (SIM) having an International Mobile Station Identifier (IMSI), the network comprising: a plurality of network elements, the method comprising the steps of:

receiving from a first one of said network elements, at a discrete network element that emulates at least one of said network elements, a location retrieval request for a mobile communications device, the request including addressing information including the primary MSISDN;

retrieving a subscriber service profile associated with the primary MSISDN;

determining, at said discrete network element, an appropriate mobile communications device for the location retrieval request based on pre-established criteria in the subscriber service profile;

retrieving the location of the appropriate mobile communications device; and transmitting a reply to the location retrieval request, the reply including the location of the appropriate mobile communications device.

22. The method as claimed in claim 21, wherein the subscriber service profile comprises preferences for location retrieval, a last location of each mobile communications device in the plurality of mobile communications devices based on previous location retrieval attempts, and a list of active or registered mobile communications devices in the plurality of mobile communications devices.

23. The method as claimed in claim 22, wherein each mobile communications device has an associated device MSISDN and the step of retrieving the location of the appropriate mobile communications device comprises retrieving from a serving Visiting Location Register the location of the appropriate mobile communications device using the primary MSISDN or retrieving from a Home Location Register the location of the mobile communications device using the device MSISDN or IMSI associated with the appropriate mobile communications device.

24. The method as claimed in claim 22, wherein the step of retrieving the location of the mobile communications device comprises determining from the subscriber service profile the last location of the appropriate mobile communications device based on previous location updates.

25. The method as claimed in claim 21, wherein each registered communications device has a unique device MSISDN and each registered communications device is associated with the primary MSISDN by a network element and is associated with the device MSISDN by a Home Location Register (HLR), including:

when addressing information of a communication for transmission to the HLR refers to the primary MSIDSN, modifying the addressing information to refer to the device MSISDN of the registered communications device, a reply from the HLR including the device MSISDN of the registered communications device in its addressing information;

when addressing information of a communication for transmission to the network element refers to the device MSISDN of the registered communications device, modifying the information to refer to the primary MSIDSN, a reply from the network element including the primary MSISDN in its addressing information.

26. The method of claim 25 wherein the network element includes at least one of a Mobile service Switching Center (MSC), a Visitor Location Register (VLR), a Gateway Mobile Location Center (GMLC), and a Short Message Service Center (SMS-C).

27. The method as claimed in claim 25, wherein the addressing information of a communication for transmission to the network element or HLR is modified by modifying the Message Transfer Part (MTP), Signaling Connection Control Part (SCCP), Transaction Capability Application Part (TCAP), and Mobile Application Part (MAP) layers of the communication.

28. A method for registering a mobile communications device in a mobile communications network in which a primary Mobile Subscriber Integrated Services Digital Network Number (MSISDN) is associated with a plurality of communications devices, the communications devices including a plurality of mobile communications devices, each mobile communications device being associated with an International Mobile Station Identifier (IMSI) and a device MSISDN, the method comprising the steps of:

receiving via a network element, at a discrete network element separate from a Home Location Register (HLR) and that emulates said HLR, a location update message from a mobile communications device in the plurality of communications devices, the location update message including the IMSI associated with the communications device and addressing information identifying the network element;

providing, from said discrete network element, the IMSI associated with the mobile communications device to said HLR associated with the mobile communications device and receiving from the HLR addressing information for the mobile communications device including the device MSISDN associated with the mobile communications device;

retrieving from a database associated with said discrete network element, the primary MSISDN using at least one of the device MSISDN or IMSI associated with the communications device;

modifying the addressing information received from the Home Location Register (HLR) to refer to the primary MSISDN.

29. The method of claim 28 wherein the addressing information is modified to refer to the primary MSISDN instead of the device MSISDN, the method including providing the modified addressing information referring to the primary MSISDN to the network element.

30. The method of claim 29 wherein the network element includes at least one of a Mobile Service Switching Center (MSC), a Visitor Location Register (VLR), a Gateway Mobile Location Center (GMLC), and a Short Message Service Center (SMS-C).

31. The method as claimed in claim 28, wherein the addressing information is modified by modifying the Message Transfer Part (MTP), Signaling Connection Control Part (SCCP), Transaction Capability Application Part (TCAP), and Mobile Application Part (MAP) layers of the communication.

32. The method as claimed in claim 31, further comprising, after the step of receiving the location update message and providing the IMSI associated with the mobile communications device to the Home Location Register (HLR), the steps of:

retrieving an address of the associated Home Location Register (HLR);

modifying the addressing information of the location update message to appear to be coming from the network element;

and forwarding the modified location update message to the HLR.

33. The method as claimed in claim 28, wherein the location update message is a Mobile Application Part (MAP) Update Location Message, the method further comprising the step of performing a MAP version negotiation sequence if the MAP version number of the MAP Update Location Message is greater than the MAP version number supported by the associated HLR.

34. The method as claimed in claim 28, further comprising the step of mapping addressing information of the network element to a predefined subset of addresses for setting service attributes associated with a subscriber service profile.

35. The method as claimed in claim 28, further comprising the step of storing a status and location of the communications device.

36. A network device for use with a mobile communications network for associating a primary Mobile Subscriber Integrated Services Digital Network Number (MSISDN) with a plurality of mobile communications devices, the communications devices each having a unique identifier associated therewith, the device including:

a database including information associating the primary MSISDNs with the plurality of mobile communications devices;

an intercept function for intercepting from a network element messages originating from mobile communications devices and destined for a Home Location Register (HLR) such that said intercept function emulates said HLR; said intercept function additionally for intercepting messages from the Home Location Register (HLR) destined for the network element such that said intercept function emulates said network element; and wherein, for a location update message received from a mobile communications device in the plurality of communications devices, the location update message including the IMSI associated with the communications device and information identifying the network element, the intercept function:

(i) provides the IMSI associated with the mobile communications device to a Home Location Register (HLR) associated with the mobile communications device and receives from the associated Home Location Register (HLR) addressing information for the mobile communications device including the device MSISDN associated with the mobile communications device;

(ii) retrieves from the database the primary MSISDN using at least one of the device MSISDN or IMSI associated with the communications device;

(iii) modifies the addressing information received from the associated Home Location Register (HLR) to refer to the primary MSISDN; and (iv) provides the modified addressing information referring to the primary MSISDN to the network element.

37. The network device of claim 36 wherein said intercept function configures messages that are received thereby from the network element and then sent by the intercept function to the associated home location register to appear to the associated home location register as arriving directly from the network element without passing through the intercept function.

38. The network device of claim 37 wherein said intercept function configures messages that are received thereby from the associated home location register and then sent by the intercept function to the network element to appear to the network element as arriving directly from the associated home location register without passing through the intercept function.

39. The network device of claim 36 wherein the network element includes at least one of a Mobile service Switching Center (MSC), a Visitor Location Register (VLR), a Gateway Mobile Location Center (GMLC), and a Short Message Service Center (SMS-C).

40. The method of claim 1 wherein the network elements include one or more of a Mobile service Switching Center (MSC), a Visitor Location Register (VLR), a Gateway Mobile Location Center (GMLC), and a Short Message Service Center (SMS-C), a home location register (HLR), Gateway GPRS Support Node (GGSN) and a service switching point (SSP).

41. The method of claim 14 wherein the network elements include one or more of a Mobile service Switching Center (MSC), a Visitor Location Register (VLR), a Gateway Mobile Location Center (GMLC), and a Short Message Service Center (SMS-C), a home location register (HLR), Gateway GPRS Support Noted (GGSN) and a service switching point (SSP).

42. The method of claim 21 wherein the network elements include one or more of a Mobile service Switching Center (MSC), a Visitor Location Register (VLR), a Gateway Mobile Location Center (GMLC), and a Short Message Service Center (SMS-C), a home location register (HLR), Gateway GPRS Support Node (GGSN) and a service switching point (SSP).

* * * * *

UNITED STATES PATENT AND TRADEMARK OFFICE
CERTIFICATE OF CORRECTION

| | |
|---|---|
| PATENT NO. | : 7,680,491 B2 |
| APPLICATION NO. | : 10/438097 |
| DATED | : March 16, 2010 |
| INVENTOR(S) | : Bohdan Konstantyn Zabawskyj et al. |

It is certified that error appears in the above-identified patent and that said Letters Patent is hereby corrected as shown below:

The title page showing the illustrative figure should be deleted to be replaced with the attached title page.

The drawing sheet, consisting of Fig. 1, should be added as shown on the attached page.

Signed and Sealed this
Fifth Day of April, 2011

David J. Kappos
*Director of the United States Patent and Trademark Office*

(12) United States Patent
Zabawskyj et al.

(10) Patent No.: US 7,680,491 B2
(45) Date of Patent: Mar. 16, 2010

(54) METHOD AND SYSTEM ALLOWING FOR ONE MOBILE PHONE NUMBER (MSISDN) TO BE ASSOCIATED WITH A PLURALITY OF WIRELESS DEVICES ('MULTI-SIM')

(75) Inventors: Bohdan Konstantyn Zabawskyj, Woodbridge (CA); Steven Robert Tait, Toronto (CA); Rubens Rahim, Toronto (CA); Claire Marion Burton, Munich (DE)

(73) Assignee: Redknee Inc. (CA)

( * ) Notice: Subject to any disclaimer, the term of this patent is extended or adjusted under 35 U.S.C. 154(b) by 874 days.

(21) Appl. No.: 10/438,097

(22) Filed: May 15, 2003

(65) Prior Publication Data
US 2004/0229601 A1   Nov. 18, 2004

(51) Int. Cl.
*H04M 3/42*   (2006.01)
(52) U.S. Cl. .............. 455/417; 455/415; 455/432.2; 455/445
(58) Field of Classification Search .......... 455/517, 455/461, 417, 413, 432.2
See application file for complete search history.

(56) References Cited

U.S. PATENT DOCUMENTS

| | | | |
|---|---|---|---|
| 6,141,564 A | 10/2000 | Bruner et al. | |
| 6,466,804 B1 | 10/2002 | Pecen et al. | |
| 6,937,713 B1* | 8/2005 | Kung et al. | 379/211.02 |
| 2002/0094811 A1* | 7/2002 | Bright et al. | 455/433 |
| 2002/0154632 A1 | 10/2002 | Wang et al. | |
| 2003/0125072 A1* | 7/2003 | Dent | 455/551 |
| 2004/0110465 A1* | 6/2004 | Bedingfield et al. | 455/3.05 |
| 2004/0180676 A1* | 9/2004 | Haumont et al. | 455/461 |
| 2004/0185888 A1* | 9/2004 | Serge | 455/517 |

FOREIGN PATENT DOCUMENTS

| | | |
|---|---|---|
| EP | 1 098 543 A1 | 5/2001 |
| GB | 1098543 | 1/1968 |
| GB | 2 375 261 A | 11/2002 |

OTHER PUBLICATIONS

Suthaharan Sivagnanasundaram, GSM Mobility Management Using an Intelligent Network Platform, Dec. 1997, University of London, pp. 27-30 and 61-90.*
GSM 03.40, Digital cellular telecommunications system (Phase 2+); Technical realization of the Short Message Service, Oct. 1996, Fourth Edition, France (first page only).
GSM 09.02, Mobile Application Part (MAP) specification, Dec. 2000, Ninth Edition, France (first page only).
GSM 03.90, Digital cellular telecommunications system (Phase 2+); Unstructured Supplementary Service Data (USSD)-Stage 2, Dec. 1996, Version 5.0.0, France (35 pp.).

* cited by examiner

*Primary Examiner*—Patrick N Edouard
*Assistant Examiner*—Eric Elcenko
(74) *Attorney, Agent, or Firm*—Katten Muchin Rosenman LLP

(57) ABSTRACT

The method and system allowing for one mobile phone number (MSISDN) to be associated with a plurality of wireless devices is described.

42 Claims, 8 Drawing Sheets